United States Patent
Lehet (12)

(10) Patent No.: US 6,249,057 B1
(45) Date of Patent: Jun. 19, 2001

(54) HYDRODYNAMIC ENERGY CONVERSION APPARATUS

(76) Inventor: Daniel Lehet, 12 Wheeler Hill Dr., Durham, CT (US) 06422

(*) Notice: Subject to any disclaimer, the term of this patent is extended or adjusted under 35 U.S.C. 154(b) by 0 days.

(21) Appl. No.: 09/421,665

(22) Filed: Oct. 20, 1999

(51) Int. Cl.[7] .................................................. H02P 9/04
(52) U.S. Cl. .............................. 290/1 R; 290/42; 290/43; 290/52; 290/53; 290/54; 290/55
(58) Field of Search ................................ 290/1 R, 42, 43, 290/53, 56

(56) References Cited

U.S. PATENT DOCUMENTS

| | | | |
|---|---|---|---|
| 4,311,011 | * | 1/1982 | Lewis ...................................... 60/641 |
| 4,508,971 | * | 4/1985 | Bailey .................................. 290/1 R |
| 4,698,516 | * | 10/1987 | Thompson ............................. 290/54 |
| 5,753,978 | * | 5/1998 | Lee ........................................ 290/54 |
| 6,051,891 | * | 4/2000 | Surodin .................................... 290/2 |

* cited by examiner

*Primary Examiner*—Elvin Enad
(74) *Attorney, Agent, or Firm*—McCormick, Paulding & Huber LLP

(57) ABSTRACT

An energy conversion apparatus for converting compressed gas to shaft power includes a housing divided between first and second chambers in fluid communication with each other and adapted to maintain a water column in the second chamber when the first chamber is pressurized with the compressed gas. The air filled first chamber houses a gravity drive system which harnesses energy created by the gravitational forces acting on a plurality of downwardly moving cylindrical containers grasped by receiving arms disposed on at least one gravity drive chain in the first chamber. The second chamber houses a buoyancy drive system which harnesses energy created by buoyant forces acting on a plurality of upwardly moving cylindrical containers grasped by receiving arms disposed on at least one buoyancy drive chain in the second chamber. An external drive shaft is driven by a coupling means which combines the energy created by the buoyancy and gravity drive systems.

13 Claims, 9 Drawing Sheets

HYDRODYNAMIC ENERGY CONVERSION APPARATUS

TECHNICAL FIELD

The present invention relates to an energy conversion apparatus and, more particularly, to a device which converts to a useful form of energy the kinetic energy created by gravitational and buoyant forces acting on a plurality of containers moving through a first chamber pressurized with air and second chamber substantially filled with water.

BACKGROUND ART

Energy is converted daily between various forms, usually from a natural resource into a quantity of usable energy. For instance, fossil fuel is converted into thermal or mechanical energy which powers automobiles and heats buildings, and hydrodynamic energy generates electricity which cools buildings and powers home appliances. Depending on the energy conversion process used, the efficiency with which energy is converted varies. Inevitably though, inefficiencies in energy conversion waste energy, and the wasted energy then returns to the environment. Forms of energy that have historically been wasted are being re-utilized, however, such as with the refinement of used petroleum products into heating fuel and lubricants.

There is a need for a device which is capable of harnessing a quantity of wasted energy and converting the energy to a more usable form. The present invention is drawn toward such a device.

DISCLOSURE OF THE INVENTION

It is an object of the present invention to provide apparatus for harnessing a quantity of wasted energy and converting it to a useful form of energy.

It is another object of the present invention to provide apparatus for converting energy in the form of pressurized gas into shaft horsepower.

According to the present invention, a hydrodynamic energy conversion apparatus includes a housing with first and second chambers in fluid communication with each other and partially filled with water, a pressurizing means for pressurizing said first chamber to maintain a water column in said second chamber, a gravity drive means disposed within said first chamber for generating a first quantity of energy while releasably securing a first plurality of containers, a buoyancy drive means disposed within said second chamber for generating a second quantity of energy while releasably securing a second plurality of containers, first and second transporting means for transporting the plurality of containers between the first and second chambers, and a coupling means for coupling together the gravity and buoyancy drive systems and an external drive shaft.

The objects, features and advantages of the present invention will become more apparent in the light of the following detailed description of best mode embodiments thereof as illustrated in the accompanying drawings.

BEST MODE FOR CARRYING OUT THE INVENTION

Figure 1:
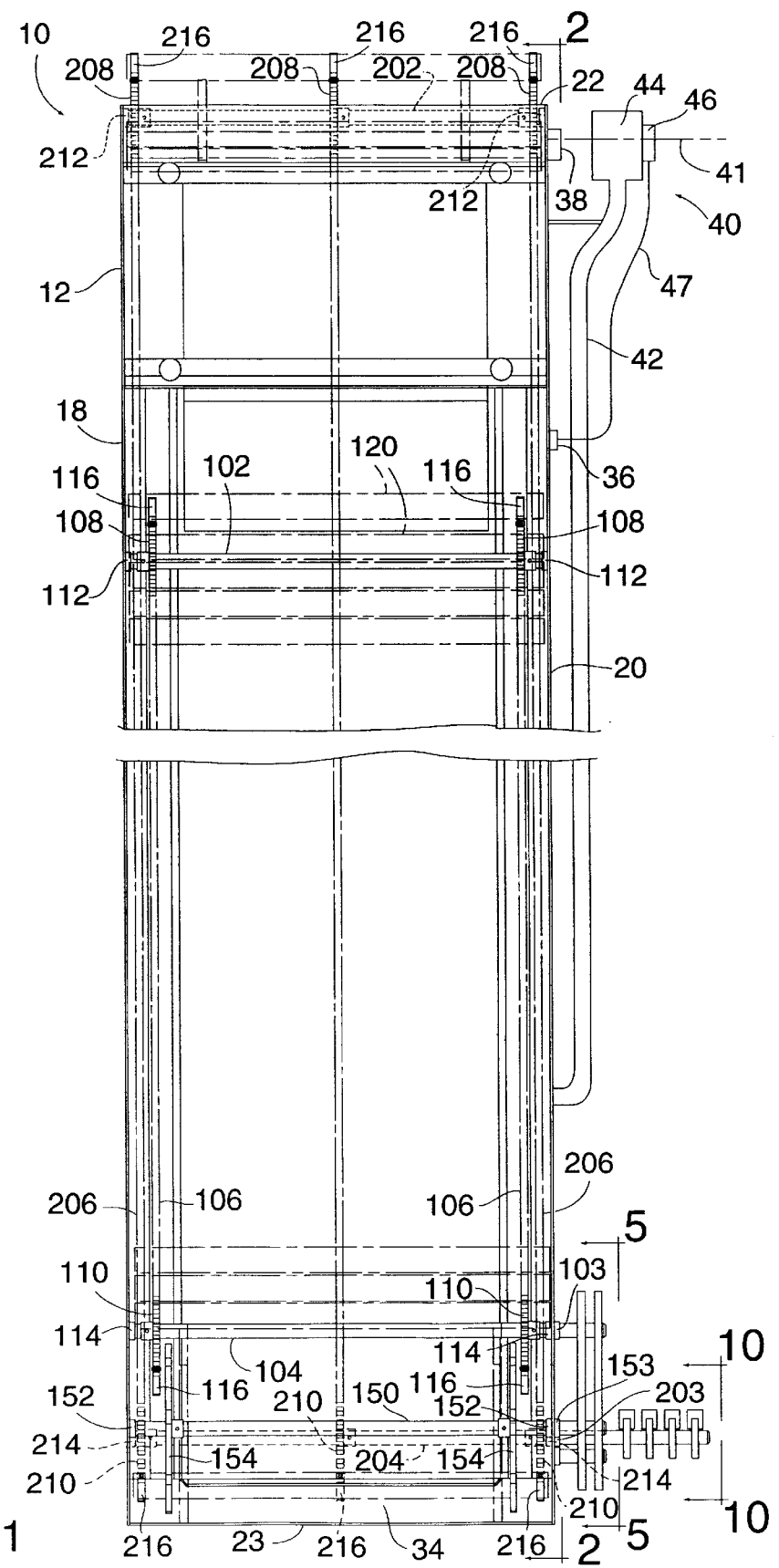
FIG. 1 is a schematic front view of a energy conversion apparatus enclosed in a housing according to the present invention.
Figure 2:
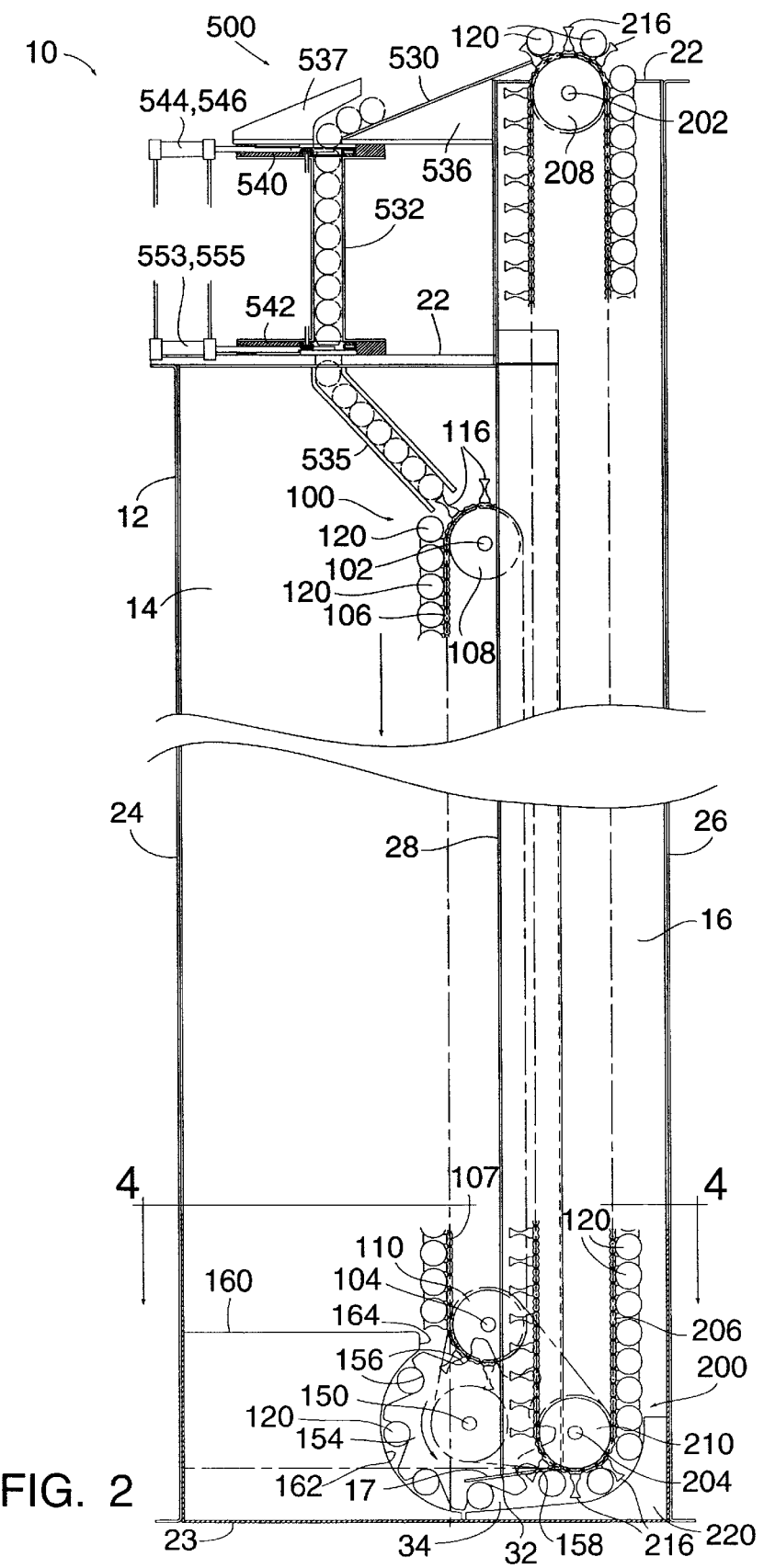
FIG. 2 is a schematic side view of the energy conversion apparatus of FIG. 1.
Figure 3:
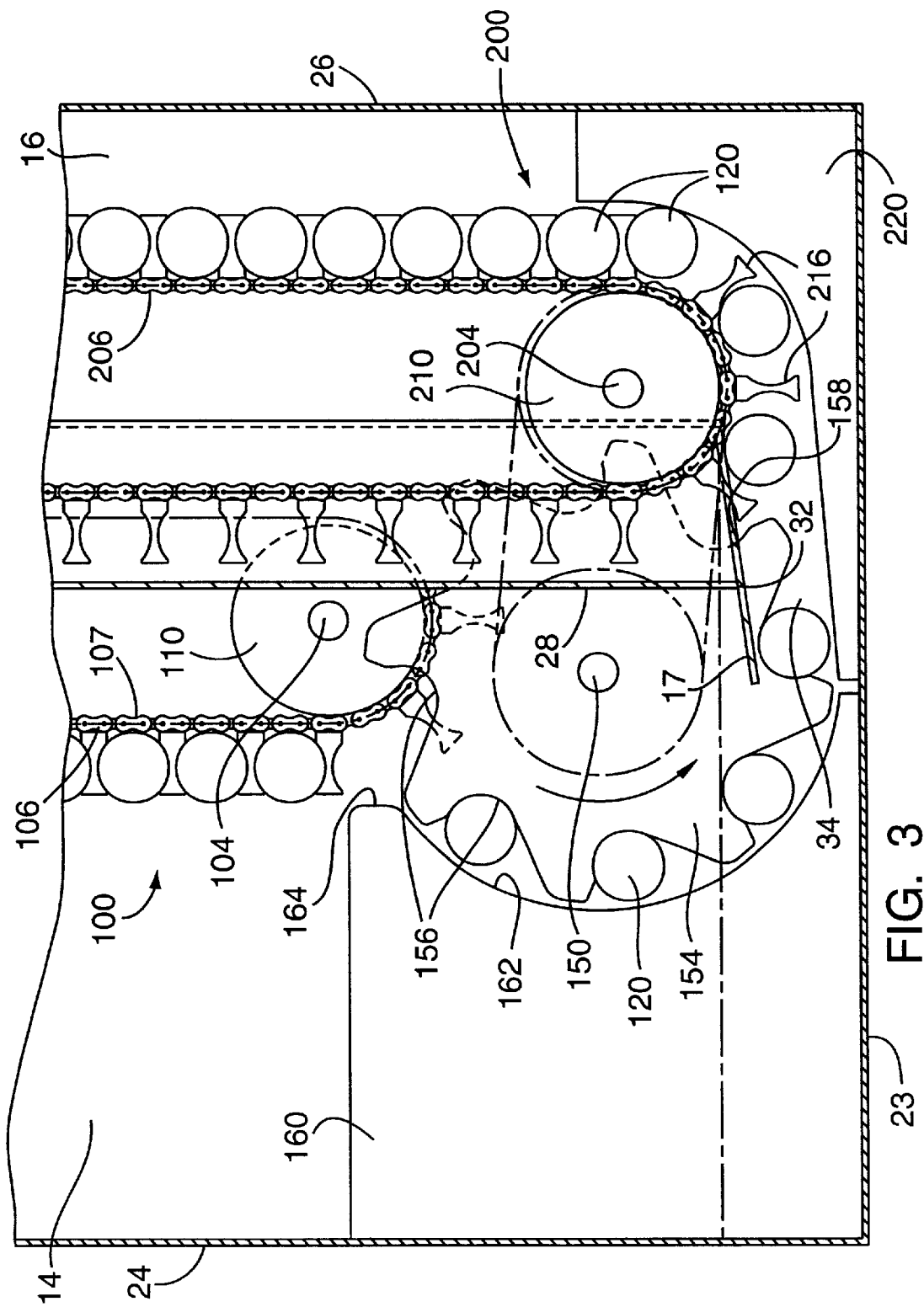
FIG. 3 is an enlarged view of a loading wheel moving containers between first and second chambers of the energy conversion apparatus shown in FIG. 2.
Figure 4:
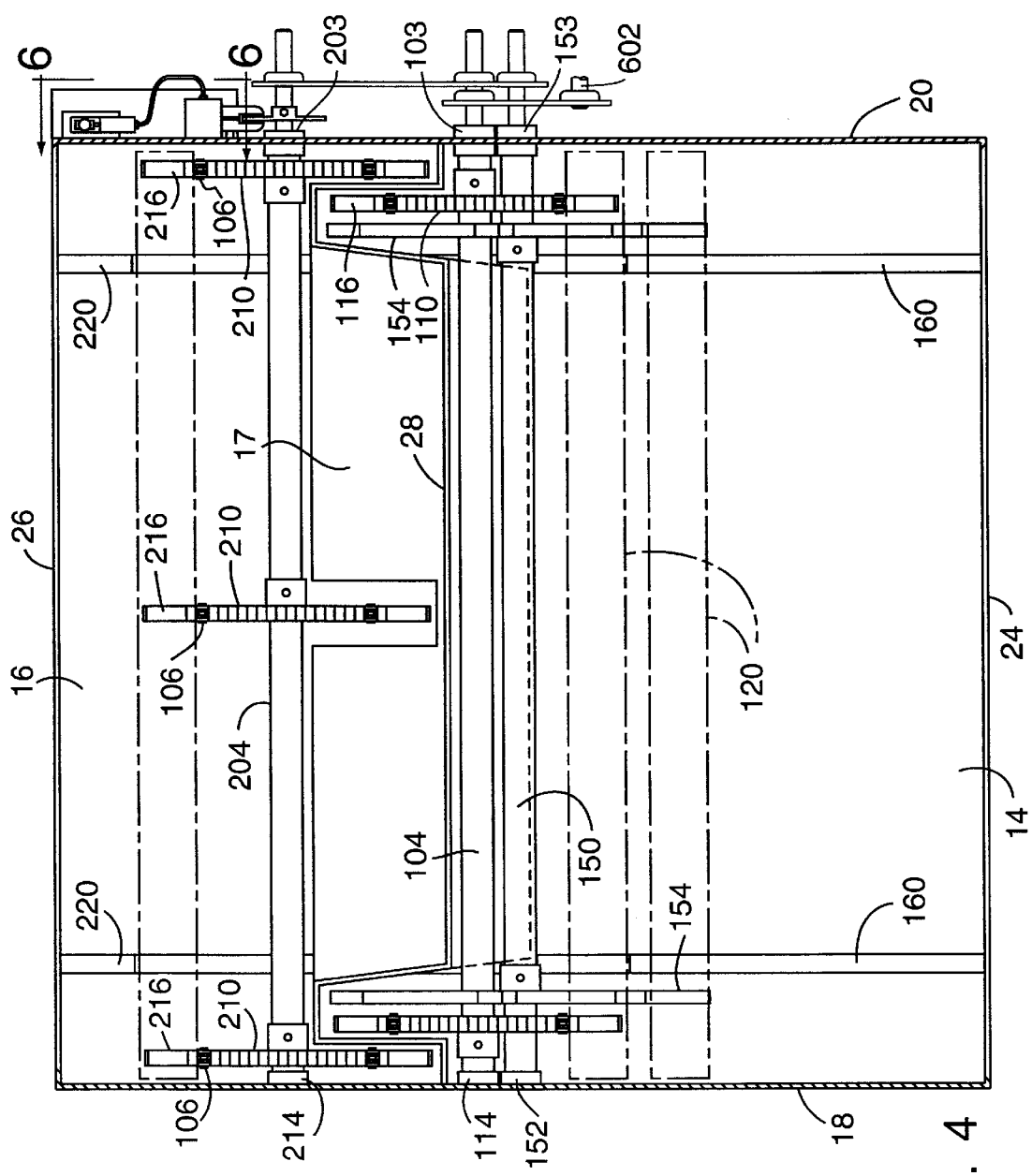
FIG. 4 is a cross sectional view of the energy conversion apparatus taken along lines 4—4 in FIG. 2.

Referring to FIGS. 1–4, an energy conversion apparatus 10 includes a system housing 12 defining a first chamber 14 in a front portion thereof and a second chamber 16 in a rear portion thereof. The housing 12 has left and right side walls 18, 20, a top surface 22, a bottom surface 23, and front & back walls 24, 26, and is preferably constructed of steel. The first and second chambers 14, 16 are separated by a divider panel 28 sealed to the top surface 22 and side walls 18, 20. A lower edge 32 of the divider panel 28 does not reach the bottom surface 23, but extends downwardly to within four inches of the bottom surface 23 to define a passageway 34 for water to move between the first and second chambers 14, 16. A shoe plate 17 is mounted to the lower edge 32 and is angled downwardly approximately 5 degrees toward the front wall 24. An air inlet 36 is fixed to the side wall 20 for pressurizing the housing. A sight glass 38 is placed on the side wall 20 which corresponds to proper operating levels in the first and second chambers 14, 16, which are defined and described in detail later.

A water column maintenance system 40 is attached to the side wall 20 to maintain the water column in the second chamber 16 at an operational level 41 and includes a tube 42 connected to the side wall 20 at a location approximately 15–20% from the bottom surface 23 of the housing 12. The tube extends upwardly along the housing to a float bowl 44 having a float switch 46. The float switch 46 is positioned so that when the water level in the second chamber 16 falls below the operational height 41, compressed air at 60 psi is released into the first chamber 14 via air line 47 and air inlet 36 to raise the water column height in the second chamber 16 and move the float bowl switch 46 to stop the flow of compressed air.

A gravity drive system 100 is disposed within the first chamber 14 and includes upper and lower gravity drive shafts 102, 104, two gravity drive chains 106 having links 107, two upper gravity drive sprockets 108 and two lower gravity drive sprockets 110. The upper gravity drive shaft 102 extends between the side walls 18, 20 of the housing 12 and is supported by two bearings 112 which are mounted in the housing to the side walls 18, 20. The two upper gravity drive sprockets 108 are fixed to the drive shaft 102. The lower gravity drive shaft 104 is supported by two bearings 114 which are mounted inside the housing between the housing side walls 18, 20. The drive shaft 104 extends through side wall 20 and is sealed by shaft seal 103. The lower gravity drive sprockets 110 are mounted to the lower shaft 104 in vertical alignment with the upper sprockets 108. One of the gravity drive chains 106 is trained over each vertically-aligned pair of gravity drive sprockets 108, 110.

A receiving arm 116 is attached to every other link 107 of the chain 106 and is shaped so that a container 120 can fit snugly between two arms 116. The receiving arms 116 of the adjacent drive chains 106 are aligned horizontally so that the containers are received in a horizontal attitude. As the chain 106 travels over one of the sprockets 108, 110, the receiving arms 116 remain perpendicular to the chain link 107 so that respective movement between adjacent links 107 creates a gap which opens as the links move over the sprocket and closes when the chain is straightened. When the gap is fully opened, a container 120 is able to move in and out of the gap. Each of the containers 120 is a hollow cylinder made of PVC pipe and is 33 inches in length and one and three eighths inches (1⅜") in diameter.

A loading wheel shaft 150 is mounted inside the first chamber 14 between two bearings 152 mounted inside the housing to side walls 18, 20. The shaft extends through side wall 20 and is sealed by shaft seal 153. Two loading wheels 154 are fixed to the loading wheel shaft 150, each wheel 154 having an outer diameter of fourteen inches and a plurality of eight recesses 156 equally spaced around the perimeter. Each recess 156 is shaped to receive one of the containers 120. A lower release point 158 is defined at a location along the circumference where the shoe plate 17 contacts each container 120 in the recess as the container rotates and forces the container from the recess 156 toward a buoyancy drive system 200 discussed in detail below.

A retainer guide 160 is positioned laterally a distance of one to three inches from each loading wheel 154. The guide 160 has a curved retaining surface 162 with a radius of 7.125 inches, or one eighth inch larger than the radius of the loading wheel. The retaining surface 162 cooperates with the recesses 156 to keep the containers 120 within the recesses 156 as the loading wheel 154 rotates. An upper portion 164 of the retaining guide 160 is shaped to guide the individual containers 120 into the recesses as the containers 120 are released by gravity from the gravity drive chain 106 into the loading wheel 154.

A buoyancy drive system 200 is mounted within the second chamber 16 and includes three upper buoyancy drive sprockets 208 mounted to an upper buoyancy drive shaft 202 and three lower buoyancy drive sprockets 210 mounted to a lower buoyancy drive shaft 204. The upper and lower buoyancy drive shafts 202, 204 are mounted on upper and lower pairs of shaft bearings 212, 214, respectively, which are attached inside the housing 12 to the side walls 18, 20. The lower drive shaft 204 extends through side wall 20 and is sealed by shaft seal 203. Each lower sprocket 210 is vertically aligned with an associated upper sprocket 208, and a buoyancy drive chains 206 is trained over each vertically-aligned pair of sprockets. One receiver arm 216 is mounted to every other link of the three chains 206.

Two container guides 220 are spaced apart and fastened to the bottom surface 23 of the housing to guide the containers into the receiver arms 216 of the buoyancy drive chains 206. Preferably, the container guides 220 are each placed between the central lower buoyancy drive sprocket and the respective lower buoyancy drive sprocket to provide optimal control of the containers moving from the gravity drive system to the buoyancy drive system. The container guides 220 are mounted to the container bottom surface 23 and preferably aligned with the retainer guides 160 to provide smooth and uninterrupted control and guidance for containers moving from the first to the second chamber.

Figure 5:
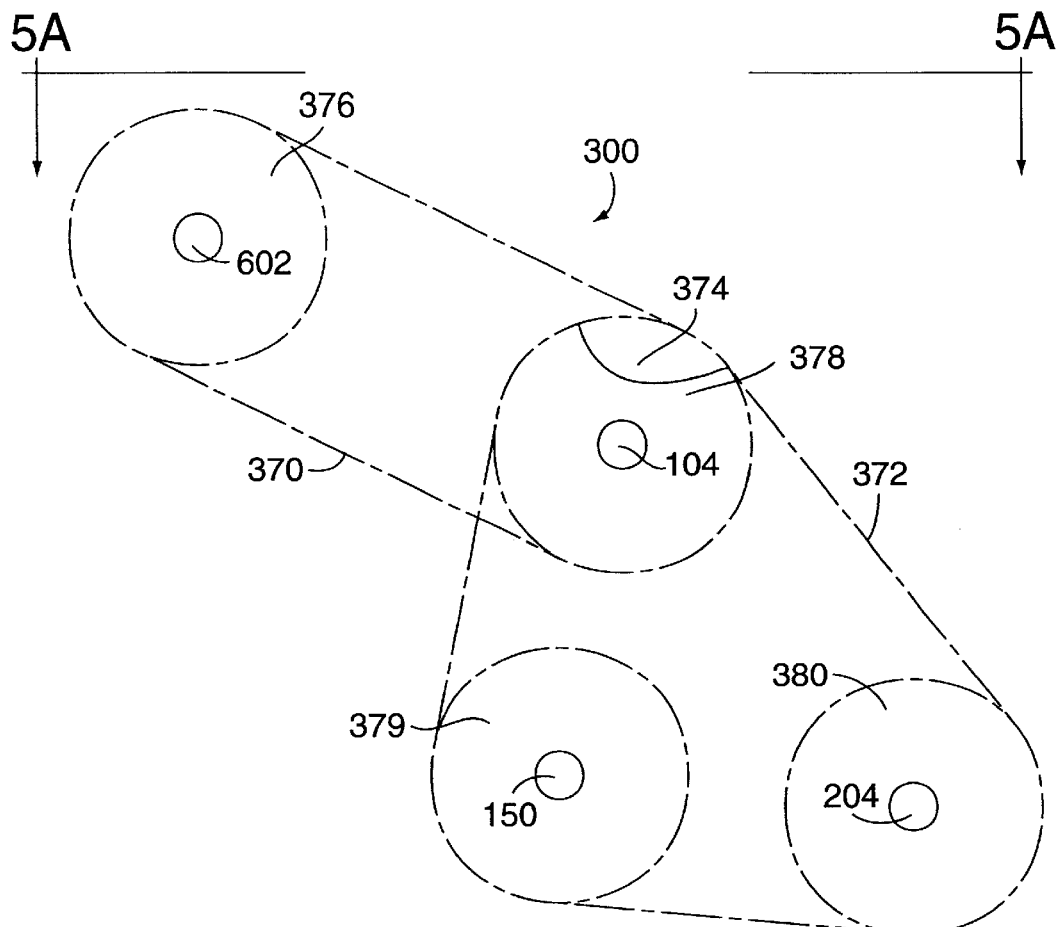
FIG. 5 is an elevated schematic view of the apparatus shown in FIG. 1 taken along lines 5—5 showing a camming drive system.
Figure 5A:
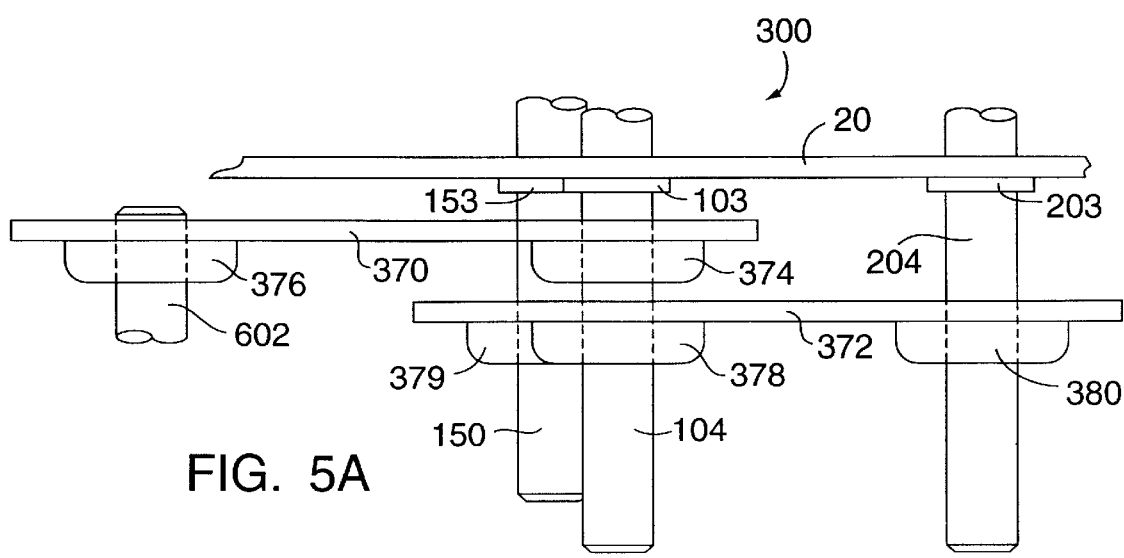
FIG. 5A is an top view of the camming drive system shown in FIG. 5 taken along the line 5A—5A.

Referring to FIGS. 5 and 5A, a drive system 300 is mounted to the outside of right side wall 20 and includes a crossover chain 370 and a synchronizing chain 372. The crossover chain 370 is trained over a first crossover sprocket 374 mounted to the lower gravity drive shaft 104 and a second crossover sprocket 376 mounted to a cam drive shaft 602. The synchronizing chain 372 is trained over three synchronizing sprockets 378–380 mounted, respectively, to the lower gravity drive shaft 104, the loading wheel shaft 150, and the lower buoyancy drive shaft 204.

Figure 6:
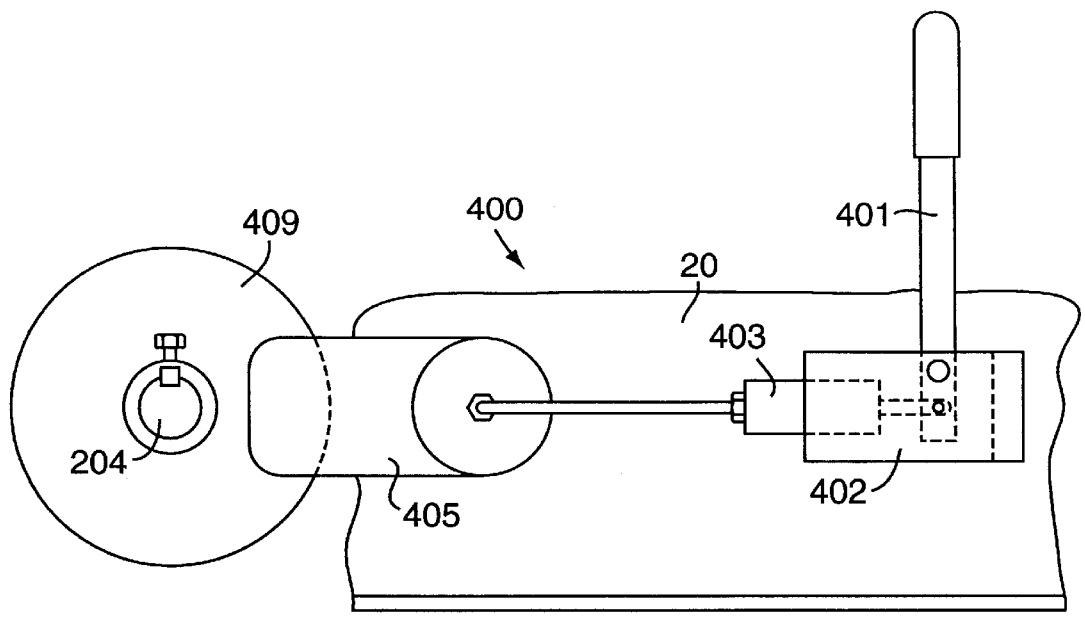
FIG. 6 is a schematic side elevation of a brake system taken along line 6—6 of FIG. 4.
Figure 7:
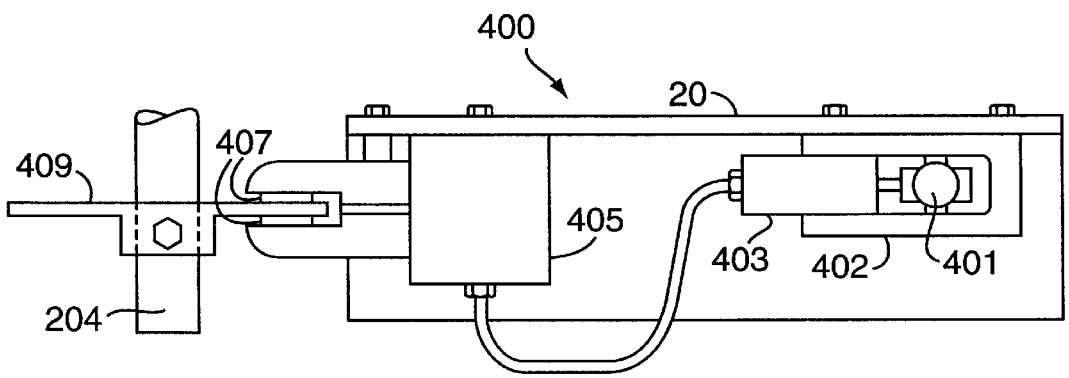
FIG. 7 is a top elevation view of the brake system shown in FIG. 6.

Referring to FIGS. 6 and 7, a brake system 400 is mounted to the right side wall 20 and includes a brake handle 401 cooperating with conventional disc brake components. A mount bracket 402 secures the handle 401 to the housing 12 and is mechanically linked to a piston and reservoir assembly 403. The piston and reservoir assembly 403 is mounted to bracket 402 and is linked to a brake caliper 405 via standard steel brake line. The caliper 405 has brake pads 407 which apply a braking force to a brake rotor 409 mounted to the lower buoyancy drive shaft 204. The caliper 405 is bolted to the right side wall 20.

Figure 8:
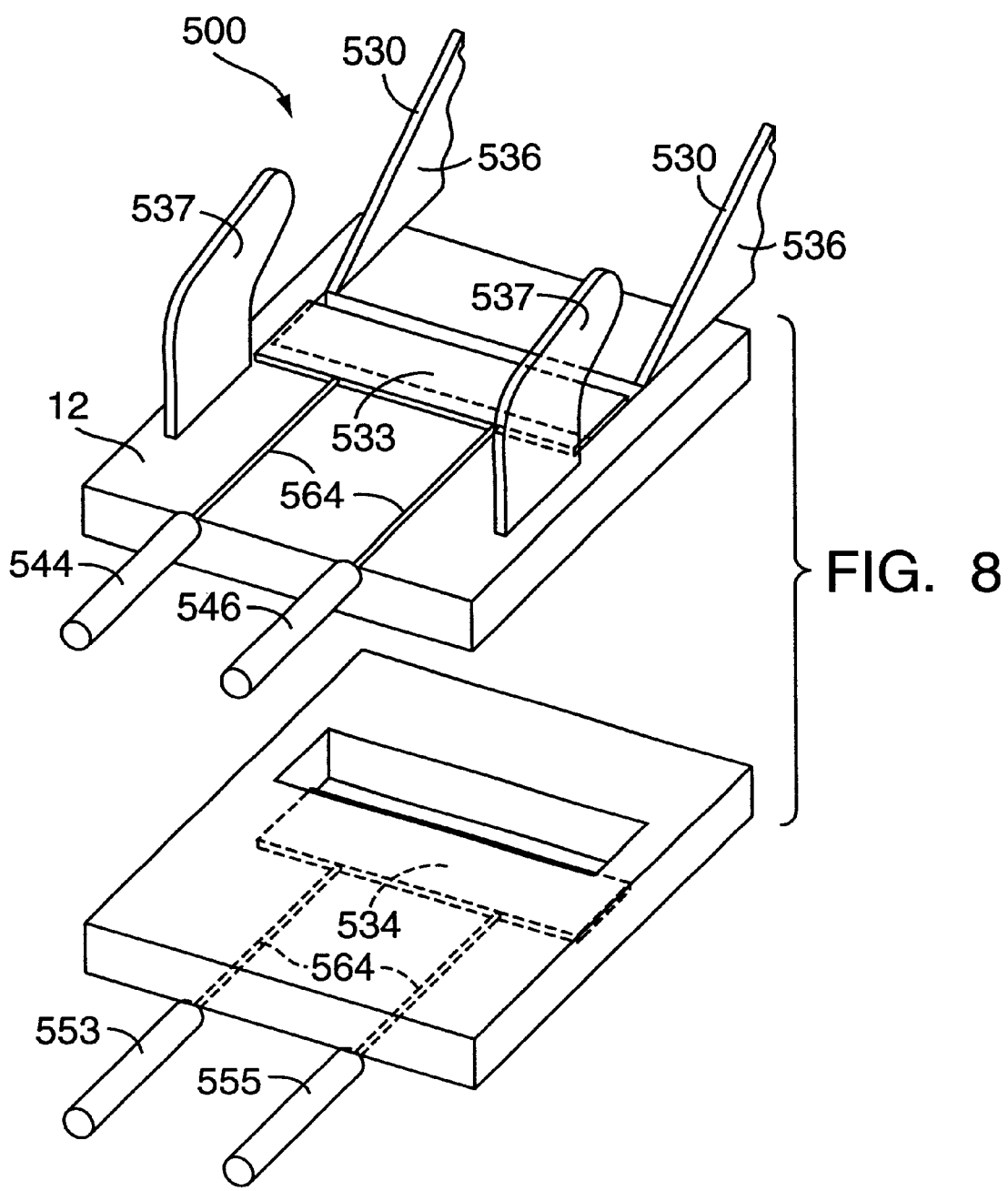
FIG. 8 is a perspective cut away view of a staging system in the energy conversion apparatus shown in FIG. 2.
Figure 9:
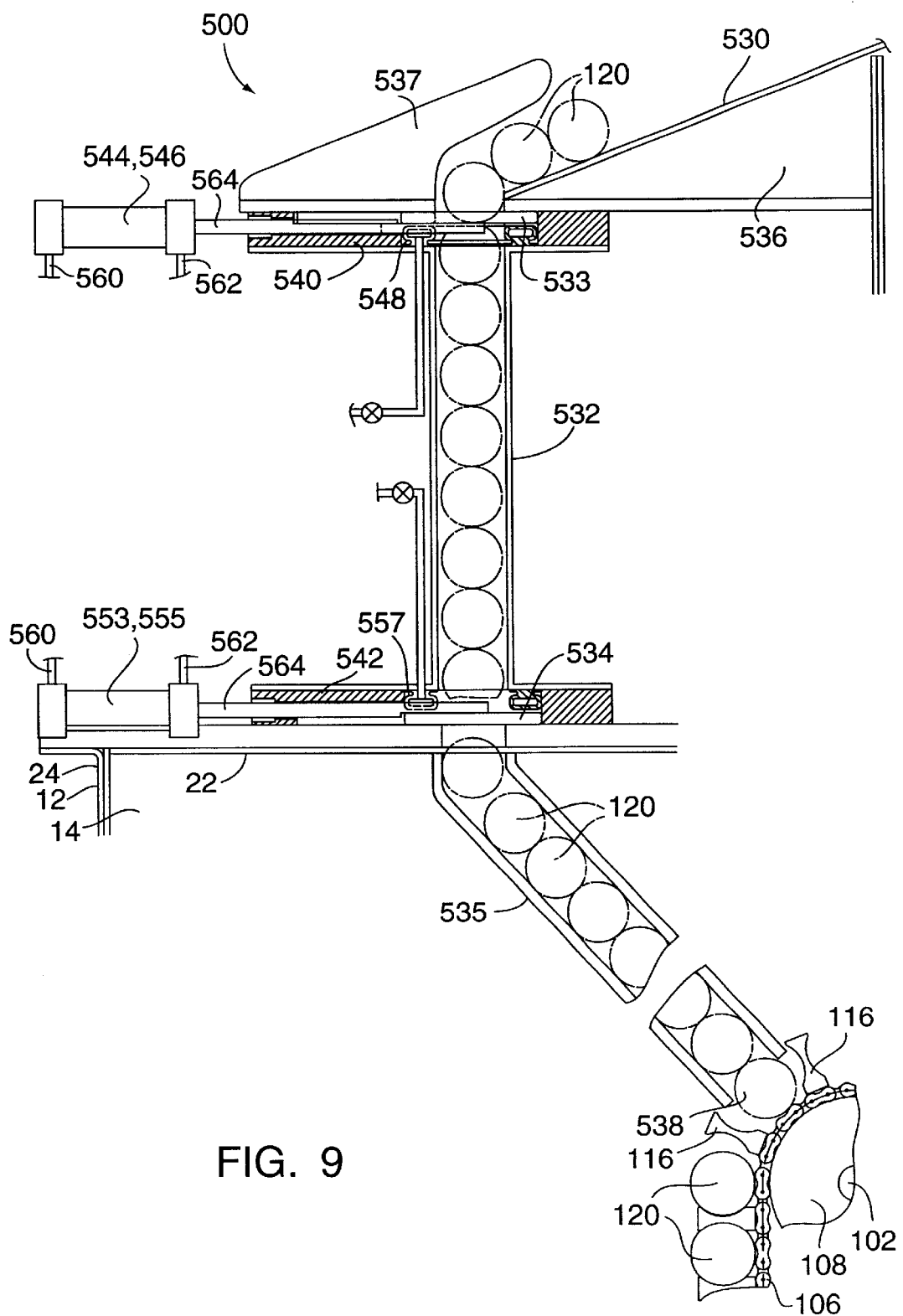
FIG. 9 is an enlarged schematic cross section of the staging system shown in FIG. 8.

Referring to FIGS. 8 and 9, a staging system 500 is mounted to the housing 12 for introducing the containers 120 into the energy conversion apparatus 10, and includes a staging rack 530, a staging chute 532, upper and lower doors 533, 534, and a loading barrel 535. The staging rack 530 includes two ramps 536 mounted to the top surface 22 of the housing 12 in parallel orientation to the side walls 18, 20. The ramps are angled downwardly toward the front wall 24 approximately 30 degrees to force the containers 120 to roll toward the staging chute 532. Two container guides 537 prevent the containers from rolling beyond, and missing, the upper door 533.

The staging chute 532 is positioned below the upper door 533 and configured to receive a quantity of eight containers 120 stacked horizontally on top of each other. The chute 532 is positioned vertically above the first chamber 14 in a plane substantially parallel to the front wall 24 of the housing 12. The upper door 533 separates the staging chute 532 from the staging rack 530 and, when closed, seals the first chamber 14 from ambient pressure outside of the housing 12. The lower door 534 controls movement of containers 120 from the staging chute 532 to the loading barrel 535. When the lower door is closed, pressure inside chamber 14 is prevented from escaping into the staging chute 532.

The loading barrel 535 is a chute positioned within the first chamber 14 below the lower door 534 and configured to receive a quantity of eleven containers 120 moving from the staging chute 532. The loading barrel 535 is angled downwardly and rearwardly toward the divider panel 28 approximately 45 degrees, and has a barrel exit 538. As containers 120 move through the barrel 535, a barrel exit 538 is positioned so that containers fall into the gap between receiving arms 100 on the chain 106.

The upper and lower doors 533, 534 are constructed of a rigid plastic material and slide in upper and lower door tracks 540, 542, to control movement of the containers 120 in the staging system 500. The upper door 533 is opened and closed by left and right upper actuators 544, 546, to control movement of the containers from the staging rack 530 to the staging chute 532. An inflatable upper bellows seal 548 is fixed in the upper door track 540 to provide an air-tight seal when the upper door 533 is closed.

The lower door 534 is opened and closed by left and right lower actuators 553, 555 to control movement of the containers from the staging barrel 532 to the loading barrel 535. An inflatable lower bellows seal 557 is fixed in the lower door track 542 to provide an airtight seal when the lower door 534 is closed.

Each of the upper and lower actuators has an extension port 560 and a retraction port 562. Standard ¼ inch diameter air line which is capable of withstanding pressures up to 75 psi is used to connect each actuator port to an air source, as discussed in detail below in FIGS. 10 & 11. Pressurizing the extension port of any of the actuators extends a pushrod 564. Pressurizing the retraction port of any of the actuators retracts the pushrod 564.

Figure 10:
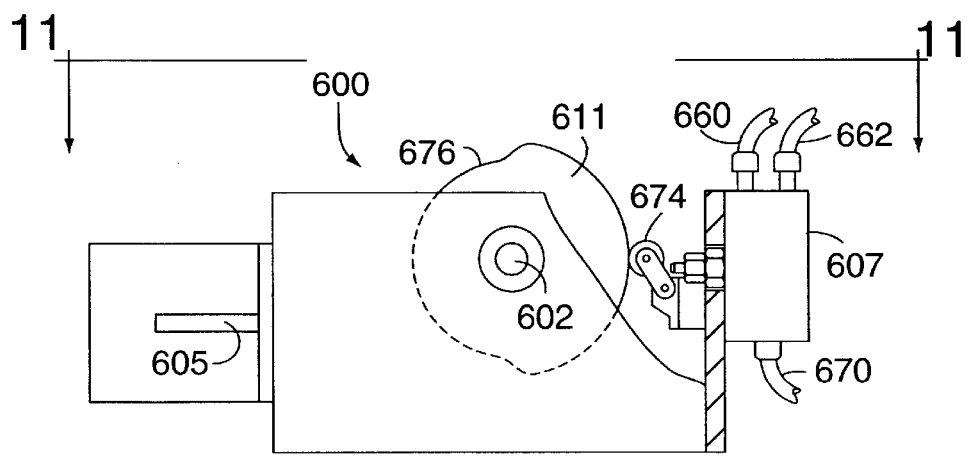
FIG. 10 is a schematic side view of the camming system shown in FIG. 1 taken along the lines 10—10.
Figure 11:
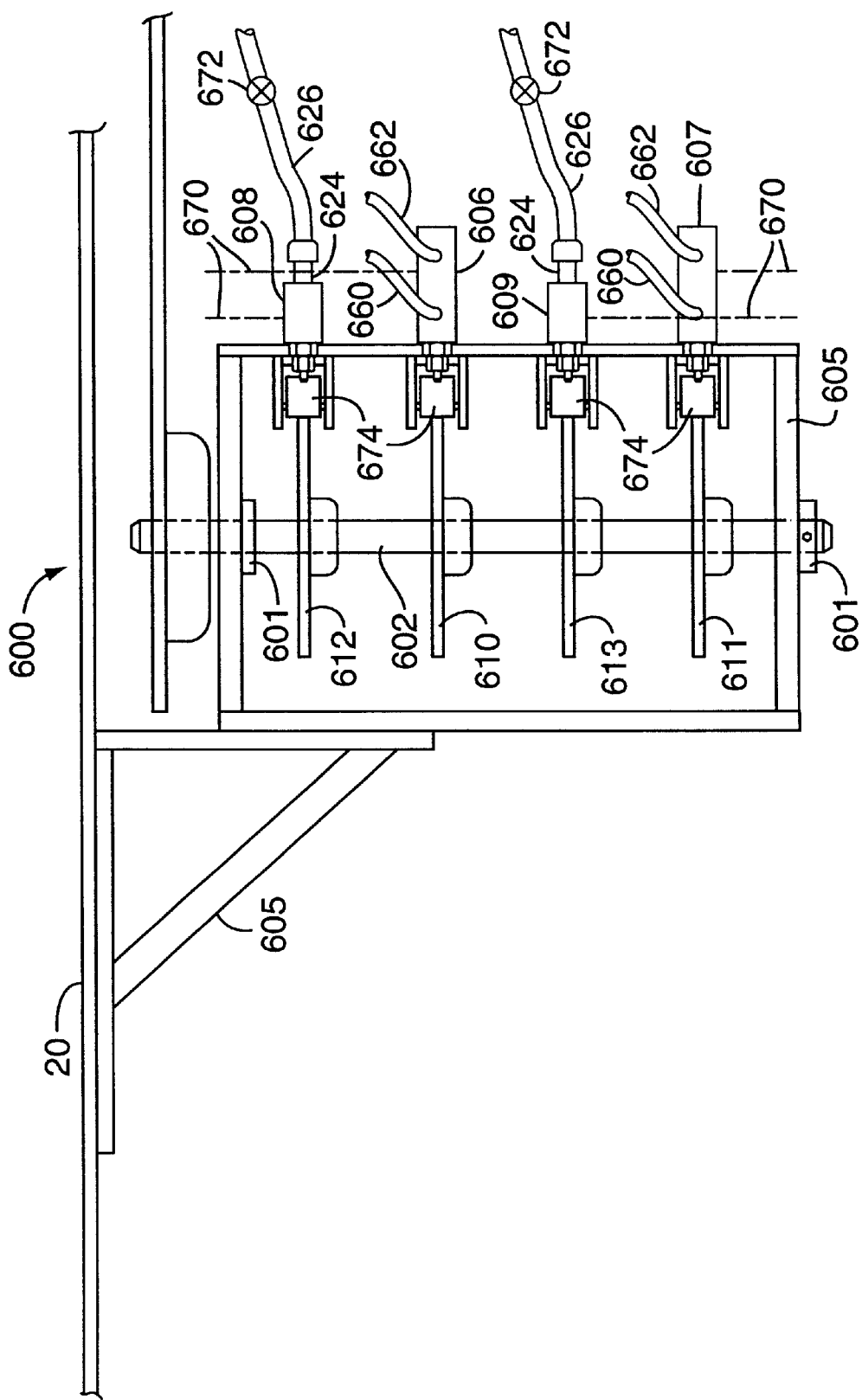
FIG. 11 is a schematic elevated view of a camming system shown in FIG. 10 taken along lines 11—11.

Referring to FIGS. 10 and 11, a camming system 600 is driven by an air source compressed about 60 psi, and includes a cam drive shaft 602, two dual-outlet cam valves 606, 607 and two single-outlet cam valves 608, 609. The high pressure (60 psi) air is required to effectively regulate the water level in the system during operation. The air loss results from the sequential opening and closing of the upper and lower doors. Each time the upper door is opened, pressurized air in the staging chute escapes to atmosphere. The escaped air is replaced by air from the first chamber each time the lower door is opened. The loss of air from the first chamber causes an associated drop in the water level of the second chamber, as a result of the lower first chamber air pressure. To maintain the correct water level, the water column maintenance system 40 uses the high pressure air to quickly replenish air in the first chamber.

The crossover chain 370 (seen in FIG. 5), is trained around the sprocket 374 mounted on lower gravity drive shaft 104 and a sprocket 376 mounted on the cam drive shaft 602. A frame 605 mounts the cam valves 606–609 and two cam drive shaft bearings 607 which support the cam drive shaft 602. The cam drive shaft 602 mounts upper and lower actuator cams 610, 611 and upper and lower bellows seal cams 612, 613.

The cam valves 606, 607 are connected, respectively, to the upper and lower door actuators 544, 546 and 553, 555 (seen in FIG. 9) using ¼ inch diameter, high pressure air lines. Valve 606 has an extension port 660 connected to the extension ports 560 of the upper actuators 544, 546, and a retraction port 662 connected to the retraction port 562 of upper actuators 544, 546. Valve 607 has an extension port 660 connected to the extension ports 560 of the lower actuators 553, 555, and a retraction port 662 connected to the retraction ports 562 of actuators 553, 555. The high pressure air source is connected to an air inlet 670 of each of the cam valve 606, 607 which direct air to the extension or retraction ports 560, 562 of the actuators.

Each of the cam valves 608, 609 has an air inlet 670 and a single air outlet 624. The outlets 624 are connected, respectively, to upper and lower bellows seals 548, 557 using ¼ inch diameter, high pressure air lines 626. Each air line 626 has a relief valve 672 for releasing air pressure from the bellow seals 548, 557 when they are not being pressurized.

As the cam drive shaft 602 rotates, a cam roller 674 on each of the cam valves 606–609 follows a contoured circumference 676 on each cam, thereby moving the cam roller 674 radially between first and second positions and directing air to one of the outlet. Rotation of the cams is synchronized so that specific seals and actuators are pressurized at proper times to operate the upper and lower doors. For instance, before the upper door can be opened, air pressure on the upper bellow seal must be released so the door can be moved. When the upper door is closed, air pressure needs to be applied to upper bellow seal to prevent the escape of pressurized air within the first chamber. Likewise, air pressure on the lower bellow seal must be controlled in a timed manner to allow opening, closing, and sealing of the door, while minimizing the amount of air that escapes from the first chamber.

In operation, the power output of the energy conversion apparatus depends upon the amount of energy that is available for use. In any case, the energy source must be in the form of, or converted to, compressed air to power the apparatus. The pressure and volume of the available air source is used to determine the appropriate size of the housing 12 using standard mathematical calculations. A higher pressure and volume of air can create a water column in a larger housing, thereby allowing larger containers to be used. Accordingly, once the energy source is evaluated for pressure consistency and flow rate, the first calculation to be made is the volume of water that the energy source can displace, i.e., the water column height which the energy source can maintain consistently over a given period of time. Once this is determined, an appropriate size for the housing and containers is calculated. The present invention has been sized to operate using an air source rated at 4 psi.

To prepare the energy conversion system for operation, containers are first loaded into the housing 12 by opening the upper and lower doors and loading containers individually into the housing through the upper door. Once inserted, the first container travels through the staging and loading barrels, and falls into the gap between two receiving arms of the gravity drive chain. Subsequent containers are loaded and accumulated in the loading and staging barrels, at which point the drive system can be manually or mechanically rotated to move containers into the housing. A simple hand-operated lever such as a socket wrench connected to one of the drive shafts is sufficient for rotating the drive system when loading the containers. As the gravity drive chain rotates, each of the containers falls into a gap between receiving arms on the gravity drive chain.

The containers travel downward with the gravity drive chain until each container is released by the force of gravity from the receiving arms as the container travels around the lower gravity drive sprocket. Each container falls into a recess of the loading wheel and travels around the loading wheel to the lower release point, where the container releases from the loading wheel and moves toward the receiving arms of the buoyancy drive chain. During system preparation, however, the containers are pushed toward the buoyancy drive system by the loading wheel. During actual operation, buoyant forces cause the containers to release from the loading wheel and move toward the buoyancy drive system. Each container is then engaged by the buoyancy drive chains, and in particular, in the gaps between two adjacent receiving arms on each chain.

Each container travels around the upper buoyancy drive sprockets until it reaches the staging rack. The staging rack engages each container and lifts the container from the gap between two receiving arms, allowing the containers to roll down the staging rack. The conversion system is fully loaded with containers when the first container travels through the entire apparatus and is released from the second chamber onto the staging rack. The embodiment of the conversion system described herein requires a total of one hundred and six containers, which are dispersed as follows: the gravity drive system 100 holds a quantity of thirty five containers; the buoyancy drive system 200 holds fifty three containers, the staging chute holds eight containers; and ten containers fit in the staging rack.

Once the containers are loaded, the brake is engaged and the housing is filled with water to the pre-operation level. The brake prevents system movement during preparation. The pre-operation water level is that which is needed to generate a water column having a height that rises slightly above the lower shoe plate in the first chamber, and close to the top surface of the housing in the second chamber.

Once the housing is filled, the water column is created in the first chamber by attaching the compressed air source, i.e., the energy source, to the air inlet 36. A conventional air regulator has been found effective at maintaining proper and consistent pressure in the first chamber.

After the water level in the second chamber reaches the float maintenance system and actuates the float switch, the high pressure air can be turned on to accurately maintain the water level in the system. The high pressure air is also needed to operate the staging system. Prior to releasing the brake and beginning operation of the system, the load source is engaged with the output shaft using a conventional engagement or coupling such as a clutch or dog.

To begin system operation, the brake is released and the drive systems will begin to move. As long as operating pressure is maintained in the first chamber, power is produced at the output. The gravitational forces on the containers forces the gravity drive chain to rotate and generate shaft power, and the buoyant forces in the buoyancy drive system forces the gravity drive chain to rotate and produce the majority of the shaft power.

One advantage of the present invention is that natural resources are used more efficiently by utilizing energy that is otherwise wasted.

Another advantage of the present invention is that the environment is improved by consuming lower amounts of natural resources to produce energy.

While preferred embodiments have been shown and described above, various modifications and substitutions may be made without departing from the spirit and scope of the invention. For example, the size of the housing and containers can be varied to utilize differing amounts of available energy. Additionally, various materials, including non-metallics, may be used throughout the apparatus which resist corrosion more effectively than steel or other metals. Further, because the principle force behind operation of the system is compressed air, the apparatus is preferably sized to efficiently utilize a source of air having a flow rate and pressure that can be maintained over extended periods of time. Still further, it is considered within the scope of this invention to regulate the water level in the housing under operating conditions using compressed air rated at less than 60 psi. Accordingly, it is to be understood that the present invention has been described by way of example and not by way of limitation.

I claim:

1. An energy conversion apparatus, comprising:
    a housing with a first chamber partially filled with water to a first chamber water level and in fluid communication with a second chamber filled with water to a second chamber water level;
    a pressurizing means for pressurizing said first chamber to maintain a difference between said second chamber water level and said first chamber water level by forcing water from the first chamber to the second chamber;
    a gravity drive means disposed within said first chamber for releasably securing a first plurality of containers and generating a first quantity of energy;
    a buoyancy drive means disposed within said second chamber for releasably securing a second plurality of containers and generating a second quantity of energy;
    a first transporting means for transporting the plurality of containers from the first chamber to the second chamber when the containers are released from the gravity drive chain;
    a second transporting means for transporting the plurality of containers from the second chamber to the first chamber when the containers are released from the buoyancy drive chain;
    an external drive shaft; and
    a coupling means for coupling the gravity drive system and the buoyancy drive system to the external drive shaft.

2. The energy conversion apparatus of claim 1, wherein the gravity drive means comprises at least one sprocket-mounted gravity drive chain.

3. The energy conversion apparatus of claim 1, wherein the gravity drive means comprises a first plurality of receiver arms disposed on said gravity drive chain, said first plurality of receiver arms being spaced apart to receive one of said pluralities of containers between two of said receiver arms.

4. The energy conversion apparatus of claim 1, wherein the buoyancy drive means has at least one sprocket-mounted buoyancy drive chain.

5. The energy conversion apparatus of claim 4, wherein buoyancy drive chain comprises a second plurality of receiver arms disposed on said buoyancy drive chain, said second plurality of receiver arms being spaced apart to receive one of said pluralities of containers between two of said receiver arms.

6. The energy conversion apparatus of claim 1, wherein the containers are cylindrically shaped and air-tight.

7. The energy conversion apparatus of claim 1, wherein the plurality of containers is transported back and forth between the first and second chambers in continuous motion.

8. The energy conversion apparatus of claim 1, wherein the second transporting means comprises a lifting means for releasing the containers from the receiver arms of the buoyancy drive chain and transporting the containers to the gravity drive means.

9. The energy conversion apparatus of claim 1, wherein the first transporting means comprises at least one loading wheel rotationally adapted for receiving a plurality of containers from the gravity drive means and releasing the plurality individually toward the buoyancy drive means.

10. The energy conversion apparatus of claim 1, wherein containers are urged by gravity into the first transporting means.

11. The energy conversion apparatus of claim 5, further comprising a staging means for receiving containers from the buoyancy drive means and loading said containers into said first chamber.

12. The energy conversion apparatus of claim 1, wherein energy is generated by the gravity drive means and transmitted to the external drive shaft.

13. The energy conversion apparatus of claim 1, wherein energy is generated in the buoyancy drive means and transmitted to the external drive shaft.

* * * * *